(12) United States Patent
Flynn (10) Patent No.: US 9,249,912 B2
(45) Date of Patent: Feb. 2, 2016

(54) HOSE COUPLING WITH RETAINING SPRING

(75) Inventor: William T. Flynn, Horton, MI (US)

(73) Assignee: Eaton Corporation, Cleveland, OH (US)

( * ) Notice: Subject to any disclaimer, the term of this patent is extended or adjusted under 35 U.S.C. 154(b) by 288 days.

(21) Appl. No.: 12/981,690

(22) Filed: Dec. 30, 2010

(65) Prior Publication Data

US 2012/0169042 A1 Jul. 5, 2012

(51) Int. Cl.
 *F16L 33/22* (2006.01)
(52) U.S. Cl.
 CPC ............... *F16L 33/227* (2013.01); *F16L 33/22* (2013.01); *F16L 33/228* (2013.01)
(58) Field of Classification Search
 CPC ....... F16L 33/22; F16L 33/227; F16L 33/228; F16L 37/084; F16L 37/22
 USPC ........... 285/115, 116, 121.4, 147.2, 244, 272, 285/276, 318
 See application file for complete search history.

(56) References Cited

U.S. PATENT DOCUMENTS

| | | | |
|---|---|---|---|
| 1,367,246 A * | 2/1921 | Ewald | 285/116 |
| 2,428,176 A * | 9/1947 | Parker | 285/116 |
| 3,333,871 A | 8/1967 | Abbiati et al. | |
| 3,805,337 A | 4/1974 | Branstetter | |
| 4,083,585 A * | 4/1978 | Helm | 285/260 |
| 4,299,012 A | 11/1981 | Oetiker | |
| 4,522,435 A | 6/1985 | Miller et al. | |
| 4,640,535 A * | 2/1987 | Hermann | 285/148.14 |
| 5,797,629 A | 8/1998 | Beagle | |
| 6,193,282 B1 | 2/2001 | Assenheimer | |
| 6,494,496 B1 * | 12/2002 | Sweeney | 285/115 |
| 6,779,269 B2 * | 8/2004 | Green et al. | 29/890.144 |
| D501,539 S * | 2/2005 | Dyer, III | D23/262 |

FOREIGN PATENT DOCUMENTS

| | | |
|---|---|---|
| GB | 1034801 A | 7/1966 |
| GB | 2248664 A | 4/1992 |
| WO | WO-2011062511 A1 | 5/2011 |

OTHER PUBLICATIONS

International Search Report and Written Opinion for International Application No. PCT/IB2011/003184, dated Jul. 27, 2012, 11 pages.

\* cited by examiner

*Primary Examiner* — James Hewitt
(74) *Attorney, Agent, or Firm* — Fishman Stewart Yamaguchi PLLC (57) ABSTRACT

A hose coupling comprising a main body having a hose nipple section with at least one barb formed thereon, and a retention spring extending from a collar formed on the main body, the retention spring overlying a portion of the hose nipple section where the retention spring applies a clamping force on a hose that is trapped and held in position between the retention spring and the hose nipple section by the barb(s).

9 Claims, 8 Drawing Sheets

HOSE COUPLING WITH RETAINING SPRING

FIELD OF THE INVENTION

The present invention pertains to a mechanical hose coupling for connecting a flexible elastomeric fluid conveying hose or tube to a pressurized fluid system. The pliable hose is retained onto the hose fitting by barbs extending from a hose nipple section of the hose coupling and a retention spring that is attached to a collar and extends outwardly to overlie the hose nipple section thereby applying a clamping force on the hose that is maintained under a variety of operating conditions.

BACKGROUND OF THE INVENTION

Mechanical fluid connections for joining pliable hoses such as a flexible elastomeric or polymeric fluid conveying hose to a pressurized fluid system have traditionally consisted of a barbed hose nipple that is inserted into a pliable hose. The barbs "bite" into the inside layer of the hose and function to retain the hose in position on the hose nipple. In some installations, a clamp such as a band clamp or a wire twist clamp is installed over the hose to apply additional clamping force on the outside of the hose to increase the retention of the hose on the barbs Prior art clamps such as band clamps or single or double wire spring clamps have been used to apply additional clamping force on the outside of the hose. For example, U.S. Pat. No. 3,805,337 to Branstetter discloses a single wire self-tightening spring hose clamp that is commonly used to apply a clamping force on a pliable hose to retain it on a barbed fitting. This is shown as clamp 10 in FIGS. 1-3 of the '337 patent.

U.S. Pat. No. 3,333,871 to Abbiati et al, discloses a dual wire self-tightening spring hose clamp that is used to apply a clamping force to a pliable hose to assist in retaining the hose in place on a barbed hose nipple of a hose coupling fitting. This spring hose clamp is shown in FIG. 2 as clamp 35 in the '871 patent.

U.S. Pat. No. 4,299,012 to Oetiker, discloses a band type hose clamp where its ends are clipped together upon assembly by extending hooks which engage apertures. The clamp can be tightened further by a bolt fastener which, upon rotation, further reduces the inside diameter of the clamp.

These clamps have proven difficult to handle in a production process because the clamps are separate pieces and their performance in some applications is suspect. Installation on the hose requires the use of a tool that can prove difficult to use in constricted environments. Also, after some period of time in service, the clamping force of the clamp degrades due to a permanent deformation under the clamp. Under high pressures, the tube or hose can experience a change in wall thickness due to axial stresses. This thinning of the wall thickness can result in a decreased clamping force on the hose when prior art clamping systems are used to apply a clamping load.

SUMMARY

What is disclosed is a hose coupling for securing a hose or tube to the coupling body using a hose hose nipple having at least one coupling barb. A retention spring is mounted on the hose coupling body to provide a hose coupling that is one piece prior to assembly of a hose or tube onto the hose coupling. The retention spring at partially covers the hose hose nipple and is retained on the body of the hose coupling at a first end and has a spring collar on a second end. The spring collar has a chamfer which contacts and presses against the hose at the hose hose nipple after the spring is first compressed for assembly of the hose onto the hose hose nipple and over the barb. The retention spring generates both an axial and a vertical force component on the hose which clamps it to the coupling barb. When the retention spring is compressed, the hose is pressed over the hose hose nipple and the coupling barb and against a hose stop formed in the hose hose nipple. Then the retention spring is released and allowed to axially extend and force the spring collar against the hose at the coupling barb. This applies a clamping force on the hose thereby securing the hose to the coupling barb and to the hose hose nipple of the hose coupling.

This clamping force is maintained as the hose thickness increases or decreases due to changes in the operating pressures. The exemplary hose coupling exhibits a radial compliance that allows for variance in the wall thickness of the hose or tube. The hose coupling also exhibits an axial compliance that allows for variance in the axial dimensions of the hose and the hose coupling When relatively high internal pressures create high tensile and axial stresses within the hose or tube wall that can result in strain induced stretching of the hose. The exemplary hose coupling has some axial compliance which automatically adjusts for the axial variations.

The spring collar is shown as having a chamfer that contacts the hose when the hose is installed on the hose nipple and the retainer spring is released. The angle of the chamfer interacts with the geometry of the hose nipple barb and the geometry of the hose to determine the level of axial and vertical forces applied to the hose by the retention spring. These dimensions and specific geometry and the spring characteristics can be varied and selected depending on the specific application to provide the required clamping force of the hose on the hose coupling.

DETAILED DESCRIPTION

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

What is disclosed is a hose coupling for securing a hose or tube to the coupling body using a hose nipple having at least one coupling barb. A retention spring is mounted on the hose coupling body to provide a hose coupling that is one piece prior to assembly of a hose or tube onto the hose coupling. The retention spring at partially covers the hose nipple and is retained on the body of the hose coupling at a first end and has a spring collar on a second end. The spring collar has a chamfer which contacts and presses against the hose at the hose hose nipple after the spring is first compressed for assembly of the hose onto the hose nipple and over the barb. The retention spring generates both an axial and a vertical force component on the hose which clamps it to the coupling barb. When the retention spring is compressed, the hose is pressed over the hose nipple and the coupling barb and against a hose stop formed in the hose hose nipple. Then the retention spring is released and allowed to axially extend and force the spring collar against the hose at the coupling barb. This applies a clamping force on the hose thereby securing the hose to the coupling barb and to the hose hose nipple of the hose coupling.

This clamping force is maintained as the hose thickness increases or decreases due to changes in the operating pressures. The exemplary hose coupling exhibits a radial compliance that allows for variance in the wall thickness of the hose or tube. The hose coupling also exhibits an axial compliance that allows for variance in the axial dimensions of the hose and the hose coupling when relatively high internal pressures create high tensile and axial stresses within the hose or tube wall that can result in strain induced stretching of the hose. The exemplary hose coupling has some axial compliance which automatically adjusts for the axial variations.

The spring collar is shown as having a chamfer that contacts the hose when the hose is installed on the hose nipple and the retainer spring is released. The angle of the chamfer interacts with the geometry of the hose nipple barb and the geometry of the hose to determine the level of axial and vertical forces applied to the hose by the retention spring. These dimensions and specific geometry and the spring characteristics can be varied and selected depending on the specific application to provide the required clamping force of the hose on the hose coupling.

Figure 1:
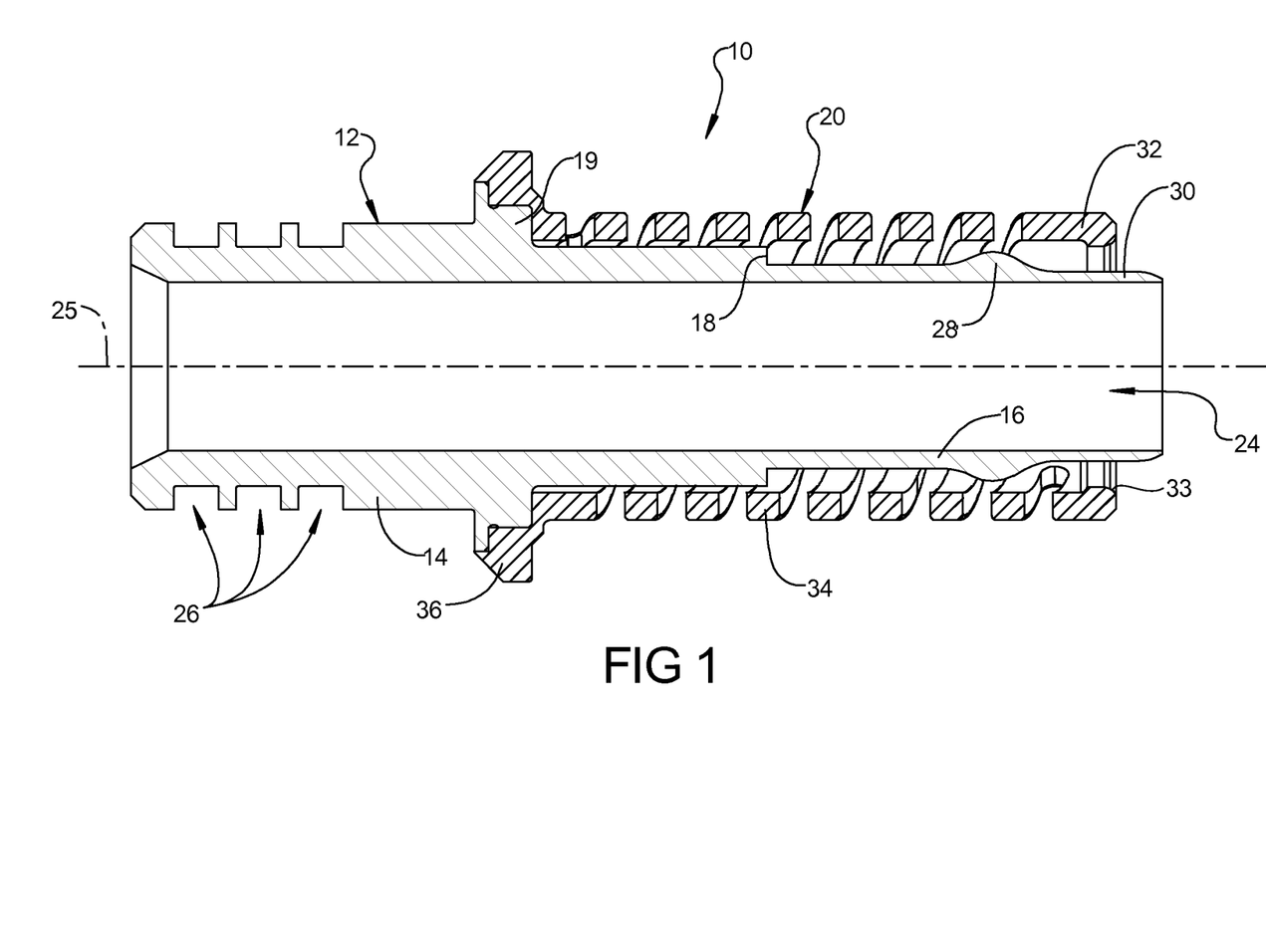
FIG. 1 is a cross-sectional view of the exemplary hose coupling without the hose installed.

Now referring to FIG. 1 of the drawings, a cross-section of an exemplary hose coupling 12 is shown. The hose coupling assembly 10 is comprised of a hose coupling 12, a hose 22 and a retention spring 20. Note that the exemplary hose coupling 12 can be used to connect with a tube or a hose. For example, a single or multiple layer elastomeric or polymeric hose can be used for a polymeric tube or any combination of materials or layers can be used with the hose coupling as disclosed herein. The hose coupling 12 is made up of a coupling body 14 and a retention spring 20. The hose nipple 16 extends from and is part of the coupling body and the hose nipple 16 includes a hose stop 18 formed therein. The hose stop 18 functions to prevent the hose 22 from being inserted past the location of the hose stop 18 by abutting the hose 22. Extending from the coupling body 14 is a cylindrical coupling collar 19 which provides a mounting surface and support for retention spring 20 which is attached to the coupling collar 19 at the spring base 36. Axially extending along the central axis 25 of the hose coupling 12 is passageway 24 which carries the fluid that is to be transported. To seal the hose coupling 12 to some other fluid device such as a pump, valve or other coupling (not shown) are seal grooves 26 that accommodate some type of sealing element such as an O-ring. Typically, devices such as O-rings are positioned within the seal grooves 26, one within each groove 26 to provide a secure sealing function so that the fluid being transported does not leak outside of the hose coupling 12.

Extending from and as part of the hose nipple 16 is at least one hose barb 28 which can have a variety of shapes including that shown in FIG. 1. The hose barb 28 provides a surface on the hose nipple 16 that has an increased thickness for providing an area of increased sealing between the hose nipple 16 and the hose 22 (see FIG. 5). The barb 16 also provides a surface that interacts with the hose 22 to deflect it upward so that the spring collar 32 can apply both axial and vertical force components on the hose 22 to increase the sealing clamp force on the hose 22 against the hose nipple 16.

Figure 2:
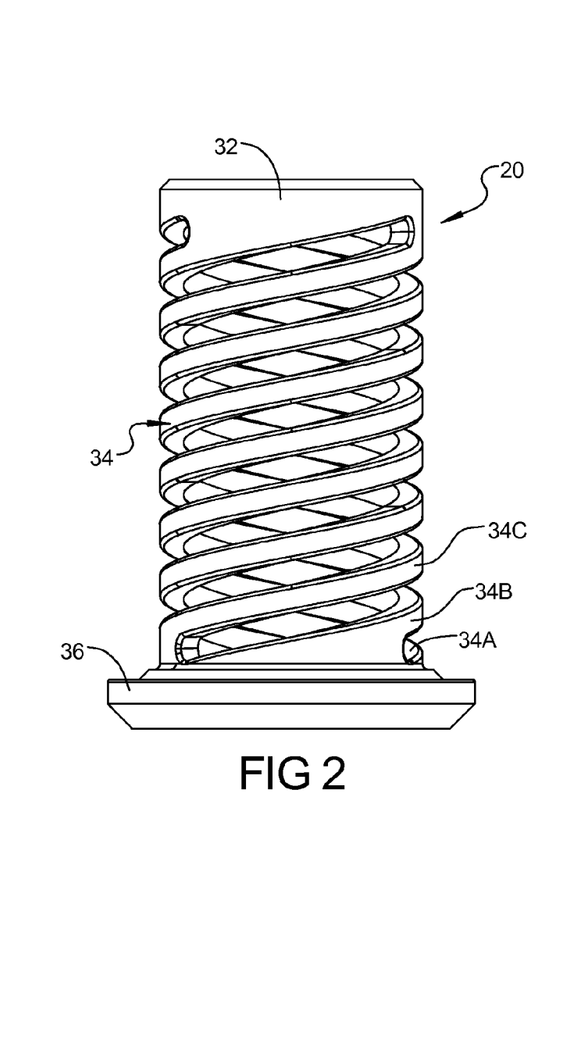
FIG. 2 is a cross-sectional view of the retention spring as shown on the exemplary hose coupling of FIG. 1.

Now referring to FIG. 2 of the drawings, a plan view of the retention spring 20 is shown. The retention spring 20 as shown, is comprised of a triple helical spring 34 which is made up of a number of spring coils 34A, 34B, 34C which are connected at their terminations by, at one end, the spring collar 32 and at the other end by a spring base 36. The spring base 36 is mounted to the collar 19 on the coupling body 14 (see FIG. 1). The spring collar 32 has a spring chamfer 33 at its inner edge where the spring chamfer 33 contacts the hose 22 at the hose barb 28 to apply an axial and a vertical force components with a resulting clamping force on the hose 22 to the hose nipple 16.

Example specifications for the retention spring 20 and the tubing 22 are as follows: the tubing is a 12.5 mm diameter having a 1.0 mm wall thickness and made out of Nylon-12 material. The spring rate of the retention spring 20 depends on the alloy used for the retention spring 20 but is in the range of 120 to 150 lbs/in if the retention spring 20 is made from 15-5 PH CRES at condition 1025 or a 17-7 PH spring condition. The specifications for the hose coupling assembly calls for the retention spring 20 to be compressed by approximately 0.3 inches when it is released after assembly and is applying an axial and a compressive force to the hose 22 at the hose nipple barb 28. This equates to a compressive force (perpendicular to the axis of the coupling body 12) of 37 lbs to 50 lbs. Note that a separate spring compression tool is required at assembly to compress the retention spring 20 a sufficient distance to allow the hose 22 to be inserted onto the hose hose nipple 16 under the retention spring 20 in its compressed state.

The retention spring 20 provides a relatively constant clamping force on the hose 22 at higher pressures since as the axial load increases on the hose coupling assembly 10 due to mechanical forces and due to pressure of the fluid. The retention spring 20 increases its installed length to compensate for the reduction in wall thickness of the hose 22 due to stretching of the hose 22 and at very high pressures, the total hose coupling assembly 10.

The retention spring 20 is shown in FIG. 2 as a three lead hybrid spring consisting of spring coils 34A, 34B and 34C. The spring coils 34A, 34B and 34C begin at the spring collar 32 and extend downwardly to the spring base 36. The spring coils 34A, 34B and 34C can be any type of known spring types such as a helical spring having some type of appropriate coil cross section such as round, rectangular, hexagonal or octagonal wire or a compression spring, a wave spring, a Belleville spring washer or any other type of material or configuration as long as the force characteristics required for this application are satisfied and the teachings of this disclosure are followed.

Figure 3:
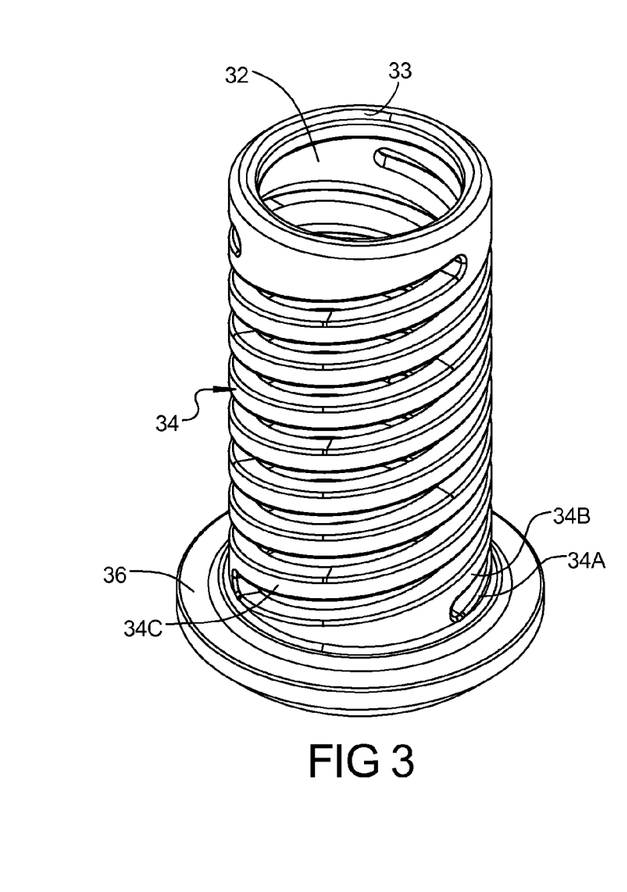
FIG. 3 is a perspective view of the retention spring of FIG. 1.

Now referring to FIG. 3 of the drawings, a perspective view of the retention spring 20 is shown. The retention spring 20 is comprised of a helical spring 34 which is made up of a number of spring coils 34A, 34B, 34C which are connected at their terminations by, at one end, the spring collar 32 and at the other end by a spring base 36.

The retention spring 20 is shown in FIGS. 2 & 3 as a three lead hybrid spring consisting of spring coils 34A, 34B and 34C. The spring coils 34A, 34B and 34C begin at the spring collar 32 and extend downwardly to the spring base 36. The spring coils 34A, 34B and 34C can be any type of known spring types such as a helical spring having some type of appropriate coil cross section such as round, rectangular, hexagonal or octagonal wire or a compression spring, a wave spring, a Belleville spring washer or any other type of material or configuration as long as the force characteristics required for this application are satisfied and the teachings of this disclosure are followed.

Figure 4:
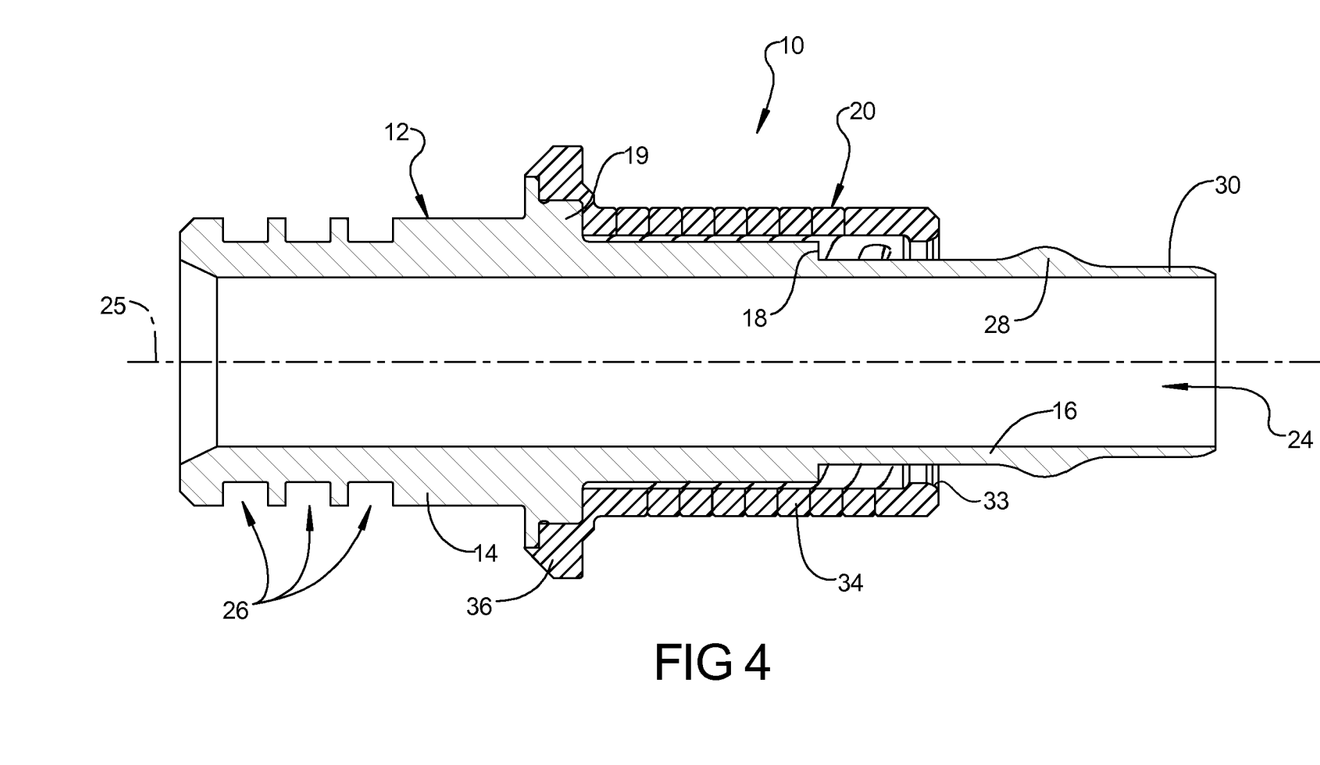
FIG. 4 is a cross-sectional view of the exemplary hose coupling assembly with the retention spring fully compressed just prior to installation of the hose.

Now referring to FIG. 4 of the drawings, the hose coupling 12 is shown with the retention spring 20 fully compressed to allow the tube or hose 22 to be installed. Hose coupling 12 is comprised of a coupling body 14 which has a hose nipple 16 extending therefrom. The retention spring 20 is shown attached to the coupling body 14 at a coupling collar 19 by a spring base 36 formed at one end of the retention spring 20. The hose coupling 12 includes the coupling body 14 where the coupling nipple 16 has a hose stop 18 formed therein. The hose stop 18 functions to prevent the hose 22 from being inserted past the location of the hose stop 18 by abutting the hose 22. Extending from the coupling body 14 is the cylindrical coupling collar 19 which serves as a mounting platform for the retention spring 20 at its spring base 36. Axially extending along a central axis 25 of the hose coupling assembly 10 is passageway 24 which carries the fluid that is to be transported. To seal the hose coupling 12 to some other fluid device such as a pump, valve or other coupling (not shown) are seal grooves 26 which carry some type of sealing device such as O-rings which are positioned within the seal grooves 26, one within each groove 26 to provide a secure sealing function so that the fluid being transported does not leak outside of the hose coupling 12.

Figure 5:
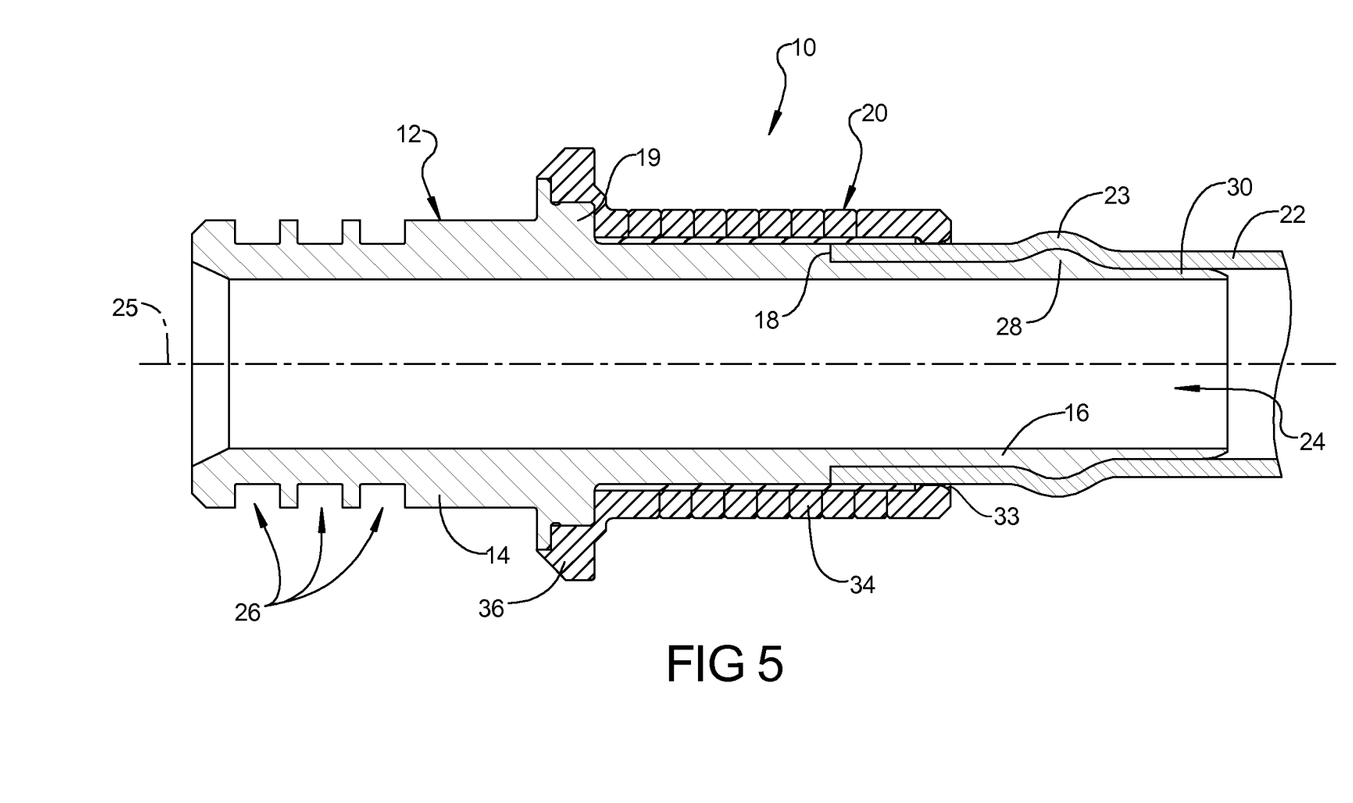
FIG. 5 is a cross-sectional view of the exemplary hose coupling assembly with the hose installed on the and the retention spring still compressed.

Now referring to FIG. 5, a cross-section of the exemplary hose coupling 12 is shown having the hose 22 fully pushed onto the hose nipple 16. To assemble the hose coupling assembly 10, the retention spring 20 is compressed by some type of spring compression tool so that the spring collar 32 is pushed back past the hose nipple barb 28 far enough to provide clearance for the hose 22 to be pushed onto the coupling nipple 16 at the nose chamfer 30, then over the hose nipple barb 28 and then up to the hose stop 18. The hose 22 deforms and is shown as hose bump 23 to at least partially conform to the hose nipple barb 28.

Figure 6:
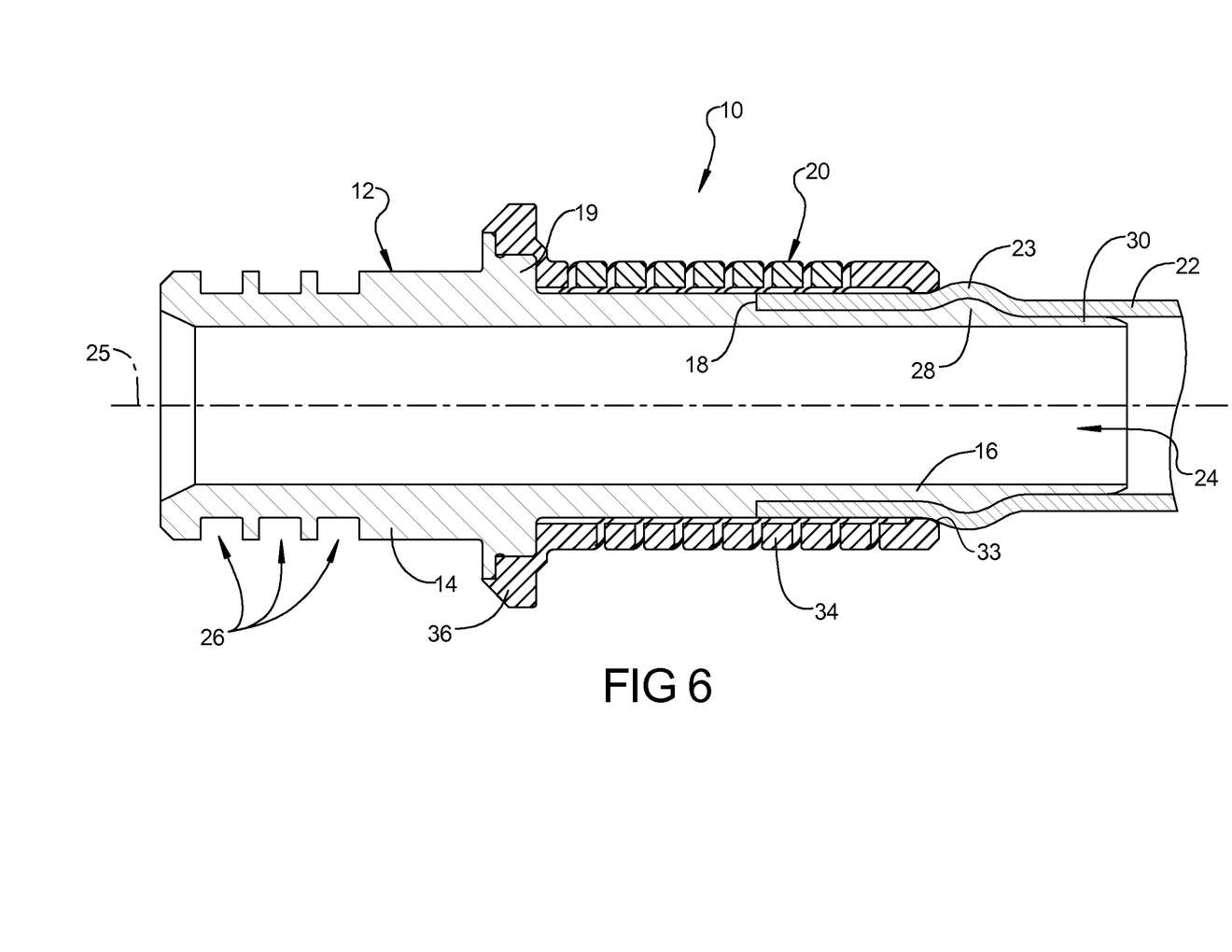
FIG. 6 is a cross-sectional view of the exemplary hose coupling assembly of FIG. 5 with the retention spring released and the spring collar pressing against the hose.

As shown in FIG. 6, the retention spring 20 is then released and the retention spring 20 axially moves to contact the hose 22 at the hose bump 23. There is a circumferential clamping force applied to the hose at the hose bump 23 that traps the hose 22 between the spring collar 32 of the retention spring 20 and the hose nipple barb 28. There is both an axial force and a radial compressive force applied to the hose 22 forcing it against the hose nipple barb 28 to seal the hose 22 with the hose coupling 12 at the coupling nipple 16 and more specifically at the hose nipple barb 28. It is contemplated that additional hose nipple barbs could be used and the shape of the hose nipple barbs could be altered to tailor the performance of the hose coupling assembly 10.

Figure 7:
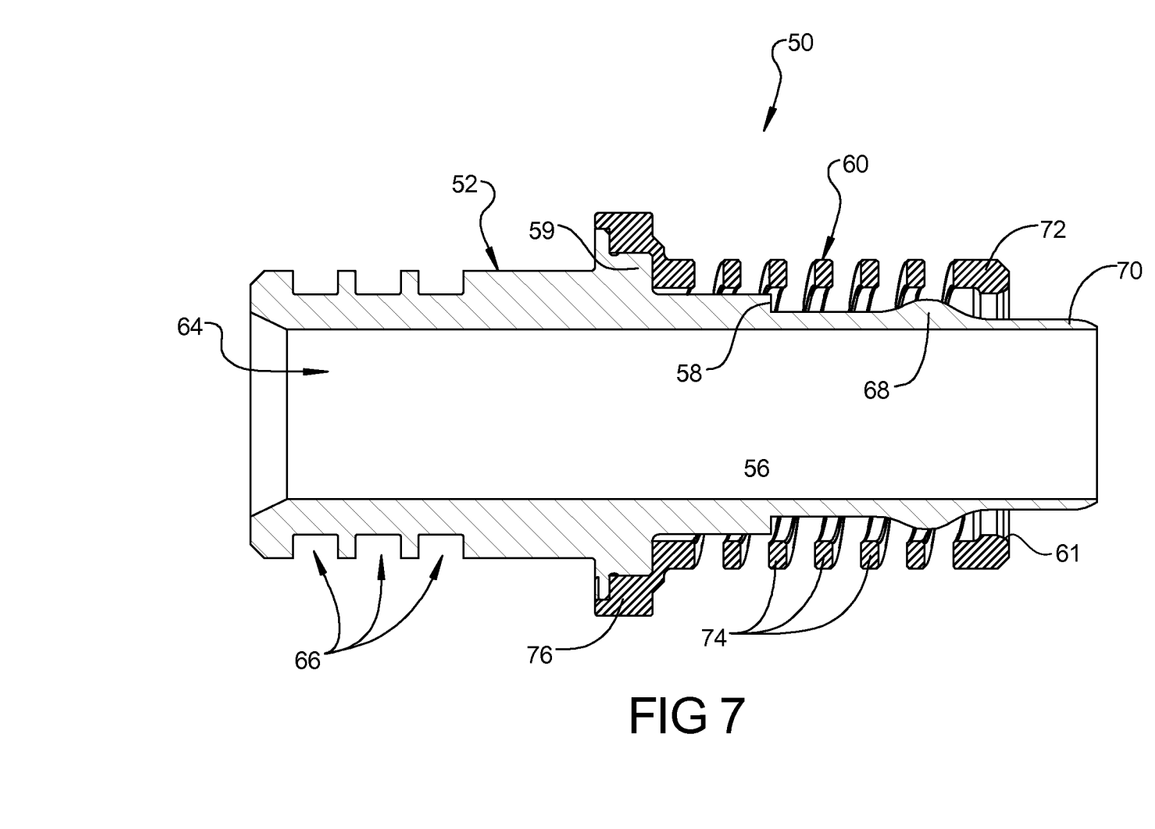
FIG. 7 is a cross-sectional view of an alternative embodiment of the retention spring as shown in FIG. 7.

Now referring to FIG. 7 of the drawings, an alternate embodiment of the hose coupling 52 is shown which is comprised of a hose coupling body 54, a hose nipple 56 and a retention spring 60. The hose coupling 52 is made up of a coupling body 54 which has a hose nipple 56 where the hose nipple 56 includes a hose stop 58. Extending from the coupling body 54 is a cylindrical coupling collar 59 which supports the retention spring 60 which is attached to the coupling collar 59 at a spring base 76. There is a spring chamfer 61 formed on the end of the spring collar 72 that serves to contact the hose 22 at the hose bump 63. The angle of the spring chamfer 61, the characteristics of the hose 62 and the geometry of the hose barb 68 largely determine the amplitude of the axial and vertical force components applied to the hose 62 by the retention spring 60. These geometries must be determined for each specific application and for each particular component material and other characteristics of the hose coupling assembly 50. Axially extending along the central axis 65 of the hose coupling 52 is passageway 64 which carries the fluid that is to be transported. To seal the hose coupling 52 to some other fluid device such as a pump, valve or other coupling are seal grooves 66 which hold some type of sealing devices, such as an O-rings which are positioned within the seal grooves 66. One O-ring is positioned within each groove 66 to provide a secure sealing function so that the fluid being transported does not leak outside of the hose coupling 52.

Figure 8:
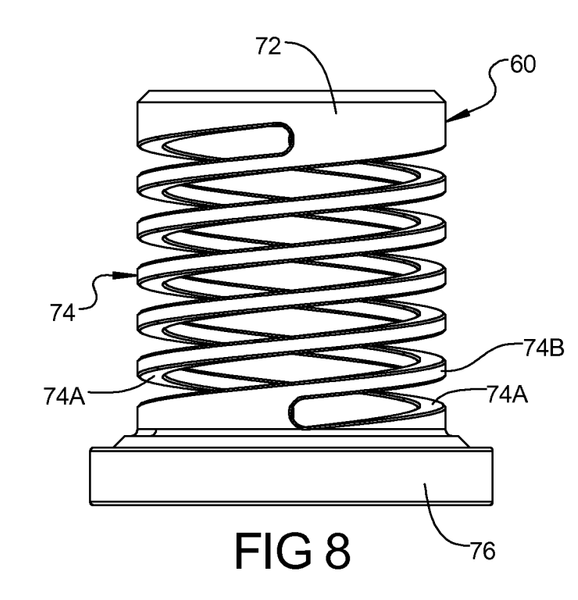
FIG. 8 is a perspective view of the alternative embodiment of the retention spring of FIG. 8.

Now referring to FIG. 8 of the drawings, a perspective view of the retention spring 60 is shown. The retention spring 60 is comprised of a helical spring 74 which is made up of two helix spring coils 74A, 74B which are connected at their terminations by, at one end, the spring collar 72 and at the other end by a spring base 76. The spring collar 72 has a spring chamfer 73 along its inner edge and this spring chamfer 73 contacts the hose 62 at the hose barb 68.

Figure 9:
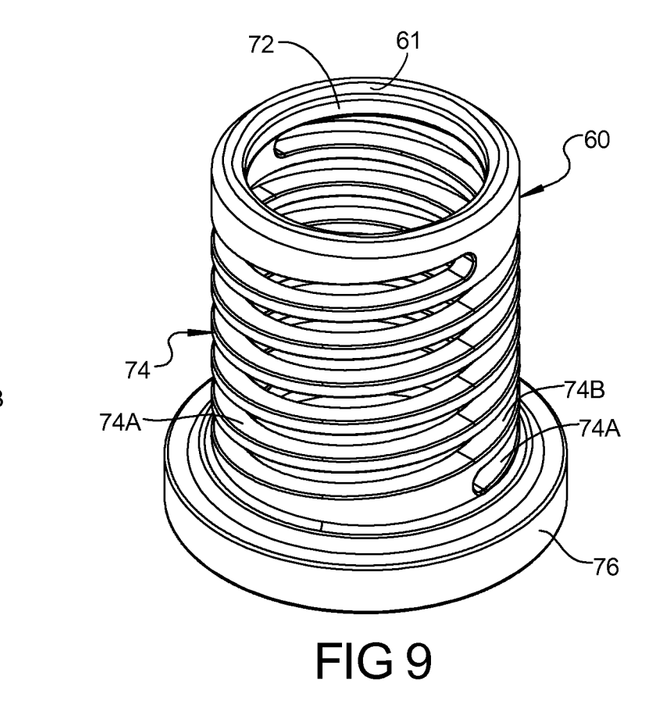
FIG. 9 is a cross-sectional view of an alternative embodiment of the hose coupling assembly of FIG. 8.

Now referring to FIG. 9, a perspective view of the retention spring 60 is shown as a two lead helix spring 74 consisting of spring coils 74A, 74B. The spring coils 74A and 74B begin at the spring collar 72 and extend downwardly to the spring base 76. The spring coils 74A and 74B can be any type of known spring types such as a helical spring, a round wire compression spring, a wave spring or any other type of material or configuration as long as the force characteristics required for this application are satisfied and the teachings of this application are followed.

Example specifications for the retention spring 60 and the hose 62 are as follows: the tubing or hose 62 is a 12.5 mm diameter having a 1.0 mm wall thickness and made out of Nylon-12 material. The spring rate of the retention spring 60 depends on the alloy used for the retention spring 60 with examples of 15-5 PH CRES at condition 1025 or 17-7 PH. The specifications for the hose coupling assembly 50 call for the retention spring 60 to be first compressed and then released after the hose 62 is installed and applies a compressive force to the hose 62 at the hose nipple barb 28. This equates to a significant compressive clamping force (perpendicular to the axis of the coupling body 52). Note that a separate spring compression tool is required at assembly to compress the retention spring 60 a sufficient distance to allow the hose 62 to be inserted onto the hose nipple 56 and under the retention spring 60 in its compressed state.

The retention spring 60 provides a relatively constant clamping force on the tube at higher pressures since as the axial load increases on the hose coupling assembly 50 due to mechanical forces and due to pressure of the fluid by simply increasing its installed length to fill in for the reduction in wall thickness due to stretching of the hose coupling assembly 50.

Figure 10:
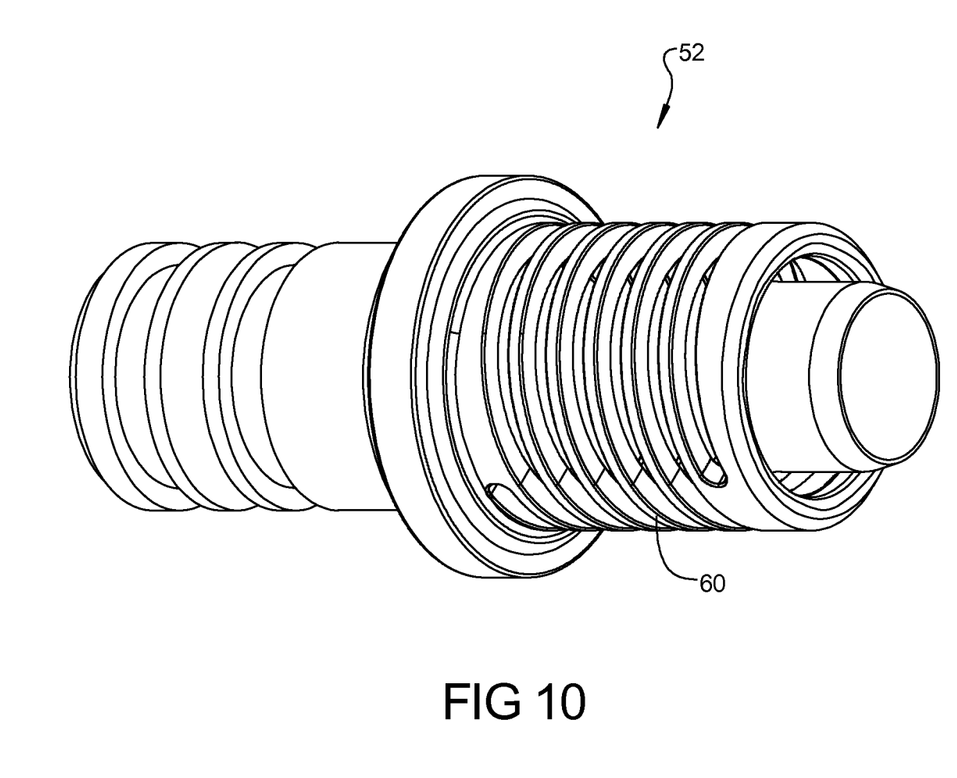
FIG. 10 is a perspective view of the alternative embodiment of the hose coupling with the retention spring installed.

Now referring to FIG. 10, a perspective view of the alternate embodiment of the hose coupling 62 with the retention spring 60 assembled onto the coupling body 54 at the coupling collar 59 by the spring base 76. To assemble the hose coupling assembly 50, the retention spring 60 is compressed so that the spring collar 72 is pushed back past the nose bump 68 far enough to provide clearance for the hose 62 to be pushed onto the coupling nose 56, over the hose bump 68 and up to the hose stop 58. The hose 62 is pushed over the nose chamfer 70 of the hose coupling 52 and over a nose bump 68 formed on the outer surface of the coupling nose 56. The hose 62 deforms at shown as a hose bump 63 to conform to the nose bump 68 formation. Then the retention spring 60 is released and it axially moves to cover and apply a clamping force by the spring chamfer 71 in the spring collar 72 to the hose 62 at the hose bump 63. There is a circumferential force applied to the hose 62 at the hose bump 63 and traps the hose 62 between the retention spring 60 and the nose bump 68. There is an axial force and a radial compressive force applied to the hose 62 forcing it against the nose bump 68 to seal the hose 62 with the hose coupling 52 at the coupling nose 56 and specifically at the nose bump 68.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

I claim:

1. A fluid coupling for retaining a hose on said fluid coupling comprising:
   a coupling body including a coupling nipple and a coupling barb formed on an intermediate portion of said coupling nipple such that said coupling barb is distanced from an end of said coupling nipple, said coupling body defining a passageway through which a fluid is flowable, said passageway having an inlet at said end of said coupling nipple through which said fluid enters said passageway from said hose, and an outlet through which said fluid exits said passageway;
   a retention spring having axially separated coils allowing for compression of said retention spring upon installation of said hose over said coupling barb, said retention spring having a spring base attached at a first end and having a spring collar attached at a second end, said spring collar having a spring chamfer that contacts and applies both a vertical and an axial clamping force on said hose against said coupling barb so as to retain said hose on said coupling nipple; and
   a coupling collar extending radially from an intermediate section of said coupling body such that the fluid coupling is insertable into a fitting from an end of the coupling body at which the outlet is located, said coupling collar having an upper surface and a lower surface, said spring base being attached to said upper surface of said coupling collar;
   wherein said coupling body is chamfered at an inner edge of said outlet such that said outlet has a larger cross-sectional area than said passageway;
   wherein said spring collar is positioned axially between said coupling barb and said inlet of said passageway when said retention spring is in an uncompressed state, and is compressed approximately 0.3 inches from said uncompressed state to an axial position between said coupling collar and said coupling barb when applying said clamping forces on said hose; and
   wherein said retention spring has a spring rate in a range on the order of between 120 pounds per inch and 150 pounds per inch to exert a compressive force perpendicular to the axis of the coupling body in a range on the order of between thirty-seven (37) pounds and fifty (50) pounds on said hose.

2. The fluid coupling of claim 1 wherein the retention spring is a two lead helix spring.

3. The fluid coupling of claim 1 wherein the retention spring is a three lead helix spring.

4. The fluid coupling of claim 1 wherein said coupling body defines at least one seal groove proximate one end of the coupling body, said at least one seal groove being configured to receive a sealing element.

5. The fluid coupling of claim 4 wherein said at least one seal groove includes three seal grooves.

6. The fluid coupling of claim 1 further comprising a hose stop configured to substantially stop said hose from moving beyond a defined location along said coupling body in an axial direction by abutting said hose.

7. The fluid coupling of claim 6 wherein said hose stop extends radially from at least a portion of said coupling nipple.

8. The fluid coupling of claim 6 wherein said hose stop is located approximately halfway between the coupling collar and the coupling barb.

9. A fluid coupling for retaining a hose to said fluid coupling comprising:
   a fluid coupling body defining a passageway through which a fluid is flowable, said passageway having an inlet through which said fluid enters said passageway from said hose, and an outlet through which said fluid exits said passageway, said coupling body being chamfered at an inner edge of said outlet such that said outlet has a larger cross-sectional area than said passageway;
   a hose nipple extending from said coupling body, said hose nipple having at least one hose barb formed on an intermediate portion of said hose nipple such that said hose barb is distanced from an end of said hose nipple at said inlet of said passageway;
   a retention spring having axially separated coils and having a spring base attached to a first end of said retention spring, said retention spring having a spring collar attached to a second end of said retention spring, said spring collar having a chamfer portion; and a coupling collar extending radially from an intermediate section of said fluid coupling body such that the fluid coupling is insertable into a fitting from an end of the fluid coupling body at which the outlet is located, said coupling collar having an upper surface and a lower surface, said spring base being attached to said upper surface of said coupling collar;

said hose engaging said hose nipple and said hose barb where said spring collar contacts said hose at said chamfer portion thereby applying both an axial and a vertical clamping force on said hose against said hose nipple;

wherein said spring collar is positioned axially between said hose barb and said inlet of said passageway when said retention spring is in an uncompressed state, and is compressed approximately 0.3 inches from said uncompressed state to an axial position between said coupling collar and said hose barb when applying said clamping forces on said hose; and wherein said retention spring has a spring rate in a range on the order of between 120 pounds per inch and 150 pounds per inch to exert a compressive force perpendicular to the axis of the coupling body in a range on the order of between thirty-seven (37) pounds and fifty (50) pounds on said hose.

* * * * *